United States Patent
Verhagen et al.

(10) Patent No.: US 11,090,781 B2
(45) Date of Patent: Aug. 17, 2021

(54) PIPE FITTING STAND

(71) Applicant: MILWAUKEE ELECTRIC TOOL CORPORATION, Brookfield, WI (US)

(72) Inventors: Michael A. Verhagen, Milwaukee, WI (US); Caroline Hope, Milwaukee, WI (US); John S. Scott, Brookfield, WI (US); Scott T. Moeller, Richfield, WI (US); Amanda M. Kachar, West Allis, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 241 days.

(21) Appl. No.: 16/286,852

(22) Filed: Feb. 27, 2019

(65) Prior Publication Data

US 2019/0275643 A1    Sep. 12, 2019

Related U.S. Application Data

(60) Provisional application No. 62/715,426, filed on Aug. 7, 2018, provisional application No. 62/640,823, filed on Mar. 9, 2018.

(51) Int. Cl.
*B25B 1/10* (2006.01)
*B25H 1/00* (2006.01)
(Continued)

(52) U.S. Cl.
CPC .................. *B25B 1/10* (2013.01); *B25B 1/02* (2013.01); *B25H 1/005* (2013.01); *F16M 11/245* (2013.01)

(58) Field of Classification Search
CPC ........ F16M 11/02; F16M 11/046; B25H 1/00; B25H 1/0021; B25H 1/0035; B25H 1/0042; B25H 1/005; B25H 1/02; B25H 1/04; B25H 1/16; B25H 7/005; B25B 5/147; B25B 1/20; B25B 1/205; B25B 1/2484
See application file for complete search history.

(56) References Cited

U.S. PATENT DOCUMENTS

| 960,916 A | 6/1910 | Heiser |
| 1,252,423 A | 1/1918 | Friess |

(Continued)

FOREIGN PATENT DOCUMENTS

| CN | 2106684 U | 6/1992 |
| CN | 2810939 Y | 8/2006 |

(Continued)

OTHER PUBLICATIONS

International Search Report and Written Opinion for Application No. PCT/US2019/019722, dated Jun. 14, 2019, 9 pages.

*Primary Examiner* — Tyrone V Hall, Jr.
(74) *Attorney, Agent, or Firm* — Michael Best & Friedrich LLP

(57) ABSTRACT

A pipe fitting stand for supporting a pipe during a work operation includes a table, and a plurality of legs coupled to the table and movable between a deployed position and a stowed position. The pipe fitting stand additionally includes a vise coupled to the table for supporting a first portion of the pipe, and a support positioned on a side of the table opposite the vise upon which a second portion of the pipe is supported. The support is adjustable relative to the table, thereby adjusting the orientation of the pipe relative to the table.

12 Claims, 13 Drawing Sheets

(51) Int. Cl.
*B25B 1/02* (2006.01)
*F16M 11/24* (2006.01)

(56) References Cited

U.S. PATENT DOCUMENTS

| | | | |
|---|---|---|---|
| 1,426,531 A | 8/1922 | Albinson | |
| 1,686,023 A | 10/1928 | McCloskey | |
| 1,695,311 A | 12/1928 | Young | |
| 1,726,898 A | 9/1929 | Jones | |
| 1,784,264 A | 12/1930 | Young | |
| 1,798,340 A | 3/1931 | Thewes | |
| 1,807,916 A | 6/1931 | Jones | |
| 1,812,967 A | 7/1931 | Long | |
| 1,897,449 A | 2/1933 | Trowbridge | |
| 2,110,718 A | 3/1938 | Shiley | |
| 2,297,980 A | 10/1942 | Perkins | |
| 2,343,924 A | 3/1944 | Petersen | |
| 2,380,911 A | 7/1945 | Petersen | |
| 2,619,858 A | 12/1952 | Starbuck et al. | |
| 2,673,742 A | 3/1954 | Vermette | |
| 2,678,790 A | 5/1954 | Egger | |
| 2,709,384 A | 5/1955 | Harris | |
| 2,831,583 A | 4/1958 | Wright et al. | |
| 2,978,114 A | 4/1961 | Halligan | |
| 2,989,142 A | 6/1961 | Gill | |
| 2,991,490 A * | 7/1961 | Pirone | B25H 1/00 408/234 |
| 3,379,431 A | 4/1968 | Gill | |
| 3,830,340 A | 8/1974 | Schäffel | |
| 4,209,274 A | 6/1980 | Martin et al. | |
| 4,671,478 A | 6/1987 | Schoenig et al. | |
| 5,135,208 A | 8/1992 | Diskin | |
| 6,073,919 A | 6/2000 | Hammit et al. | |
| 7,430,968 B2 | 10/2008 | Clark | |
| 7,537,186 B2 | 5/2009 | Putre et al. | |
| 7,690,408 B2 | 4/2010 | Sugiura | |
| 7,992,852 B2 * | 8/2011 | Marineau | B25B 7/123 269/89 |
| 8,276,895 B2 | 10/2012 | Brown et al. | |
| 8,727,330 B2 | 5/2014 | Hamm et al. | |
| 8,777,205 B2 | 7/2014 | Hamm et al. | |
| 8,967,606 B2 | 3/2015 | Hamm et al. | |
| 2008/0029662 A1 | 2/2008 | O'Rourke | |
| 2009/0121405 A1 * | 5/2009 | Brown | B25B 1/2484 269/216 |
| 2010/0107838 A1 | 5/2010 | Berg et al. | |
| 2010/0269649 A1 | 10/2010 | Rantz | |
| 2016/0195200 A1 | 7/2016 | VanValkenburgh | |
| 2017/0129094 A1 | 5/2017 | Hamm et al. | |

FOREIGN PATENT DOCUMENTS

| | | |
|---|---|---|
| CN | 201205613 Y | 3/2009 |
| CN | 201848777 U | 6/2011 |
| CN | 202592233 U | 12/2012 |
| CN | 103831746 B | 6/2014 |
| CN | 107186676 A | 9/2017 |
| DE | 304175 A | 1/1917 |
| DE | 8019302 U1 | 12/1980 |
| DE | 8708552 U1 | 7/1987 |
| KR | 1020110065198 A | 6/2011 |

\* cited by examiner

PIPE FITTING STAND

CROSS-REFERENCE TO RELATED APPLICATIONS

This application claims priority to U.S. Provisional Patent Application No. 62/715,426 filed on Aug. 7, 2018 and U.S. Provisional Patent Application No. 62/640,823 filed on Mar. 9, 2018, the entire contents of both of which are incorporated herein by reference.

FIELD OF THE INVENTION

The present invention relates to workpiece supporting stands, and more particularly to pipe fitting stands.

BACKGROUND OF THE INVENTION

Pipe fitting stands are generally used to support a pipe during various operations such as threading, cutting, welding, etc. Pipe fitting stands typically include a table providing an upwardly directed work surface legs connected to the table.

SUMMARY OF THE INVENTION

The present invention provides, in one aspect, a pipe fitting stand for supporting a pipe during a work operation, the pipe fitting stand including a table, a plurality of legs coupled to the table and movable between a deployed position and a stowed position, a vise coupled to the table for supporting a first portion of the pipe, and a support positioned on a side of the table opposite the vise upon which a second portion of the pipe is supported, wherein the support is adjustable relative to the table, thereby adjusting the orientation of the pipe relative to the table.

The present invention provides, in another aspect, a pipe fitting stand for supporting a pipe during a work operation, the pipe fitting stand including a table, a plurality of legs coupled to the table and moveable between a first position and a second position via a linkage mechanism, and a stirrup coupled to one of the plurality of the legs to facilitate pivoting the plurality of legs between the first position and the second position.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
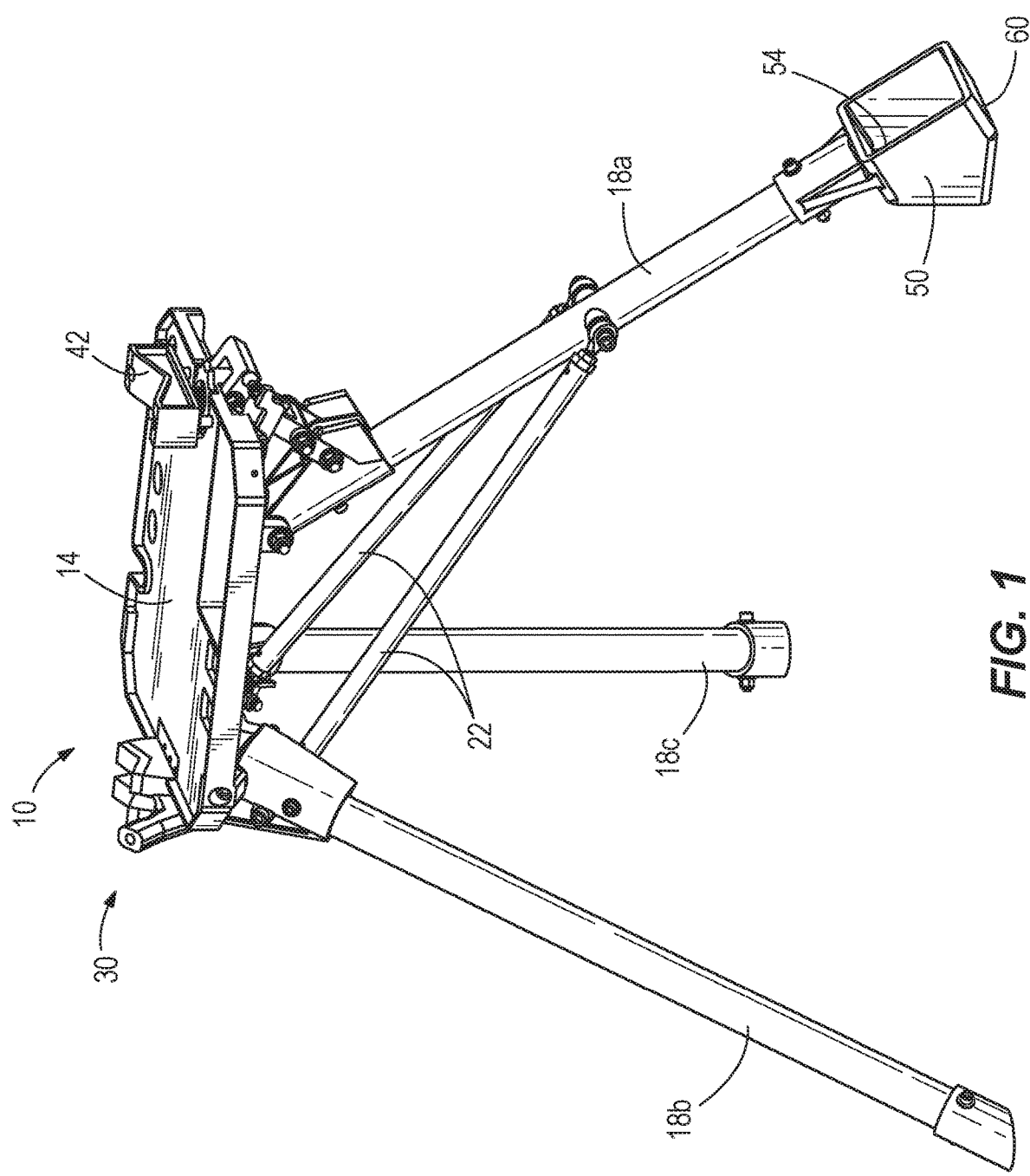
FIG. 1 is a perspective view of a pipe fitting stand in accordance with an embodiment of the invention.
Figure 4:
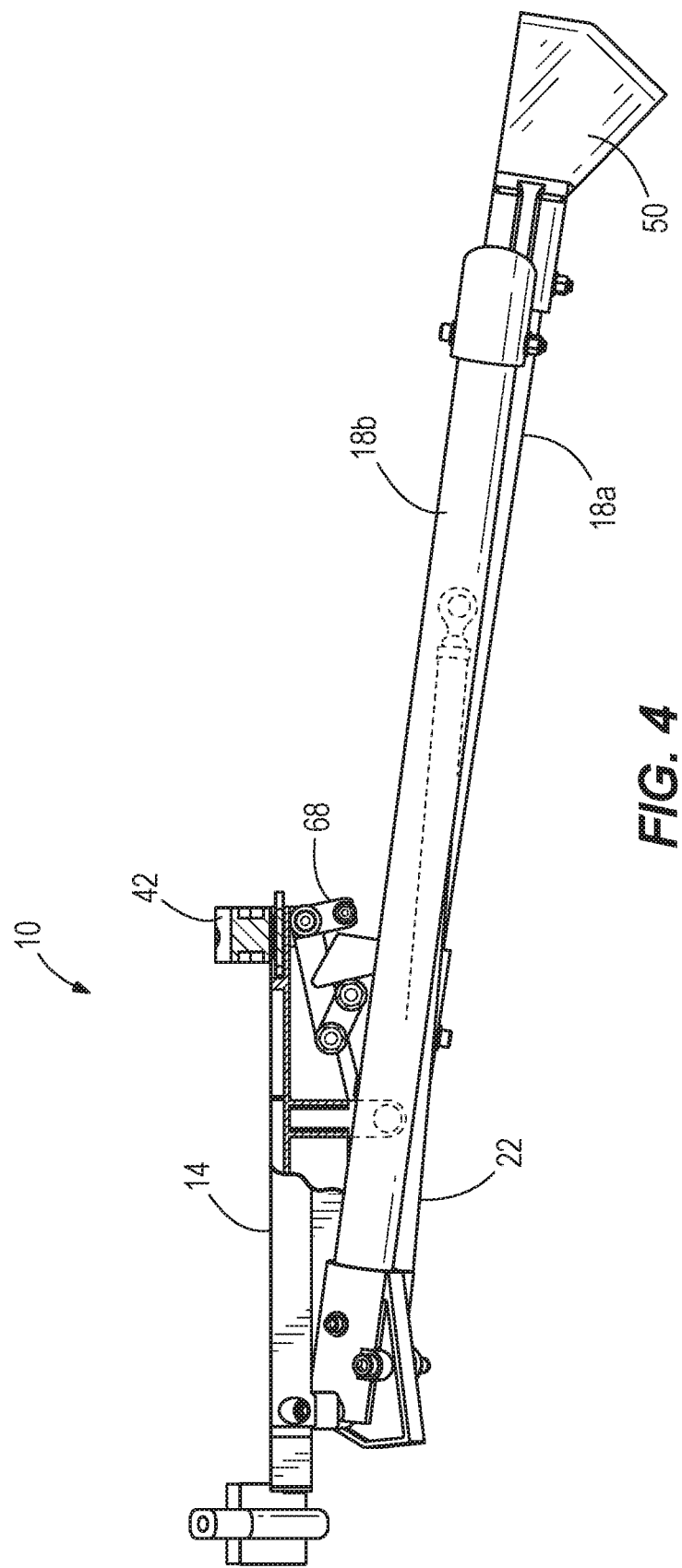
FIG. 4 is a side view of the pipe fitting stand of FIG. 1 in the folded state.
Figure 5:
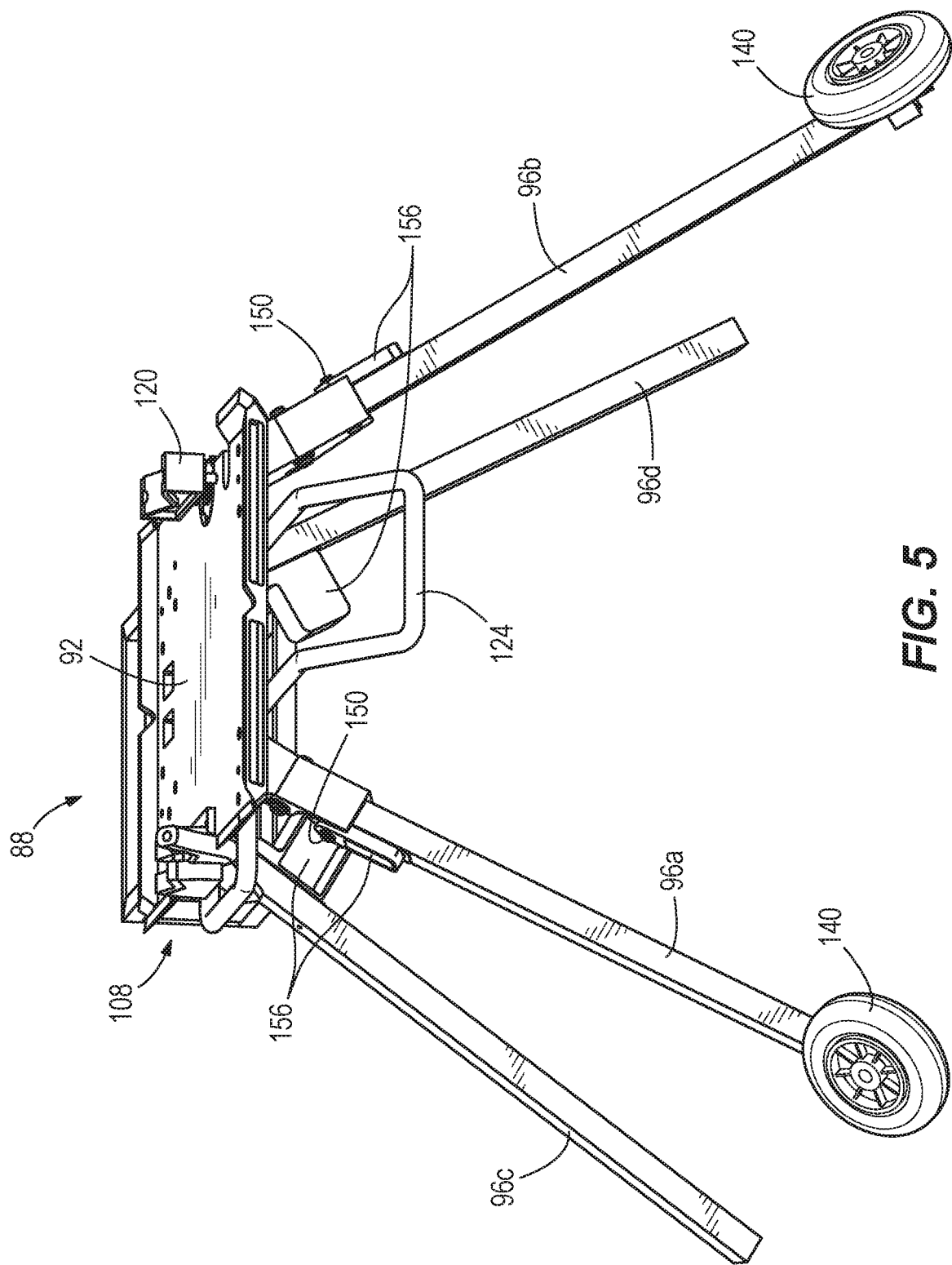
FIG. 5 is a perspective view of a pipe fitting stand in accordance with another embodiment of the invention.
Figure 6:
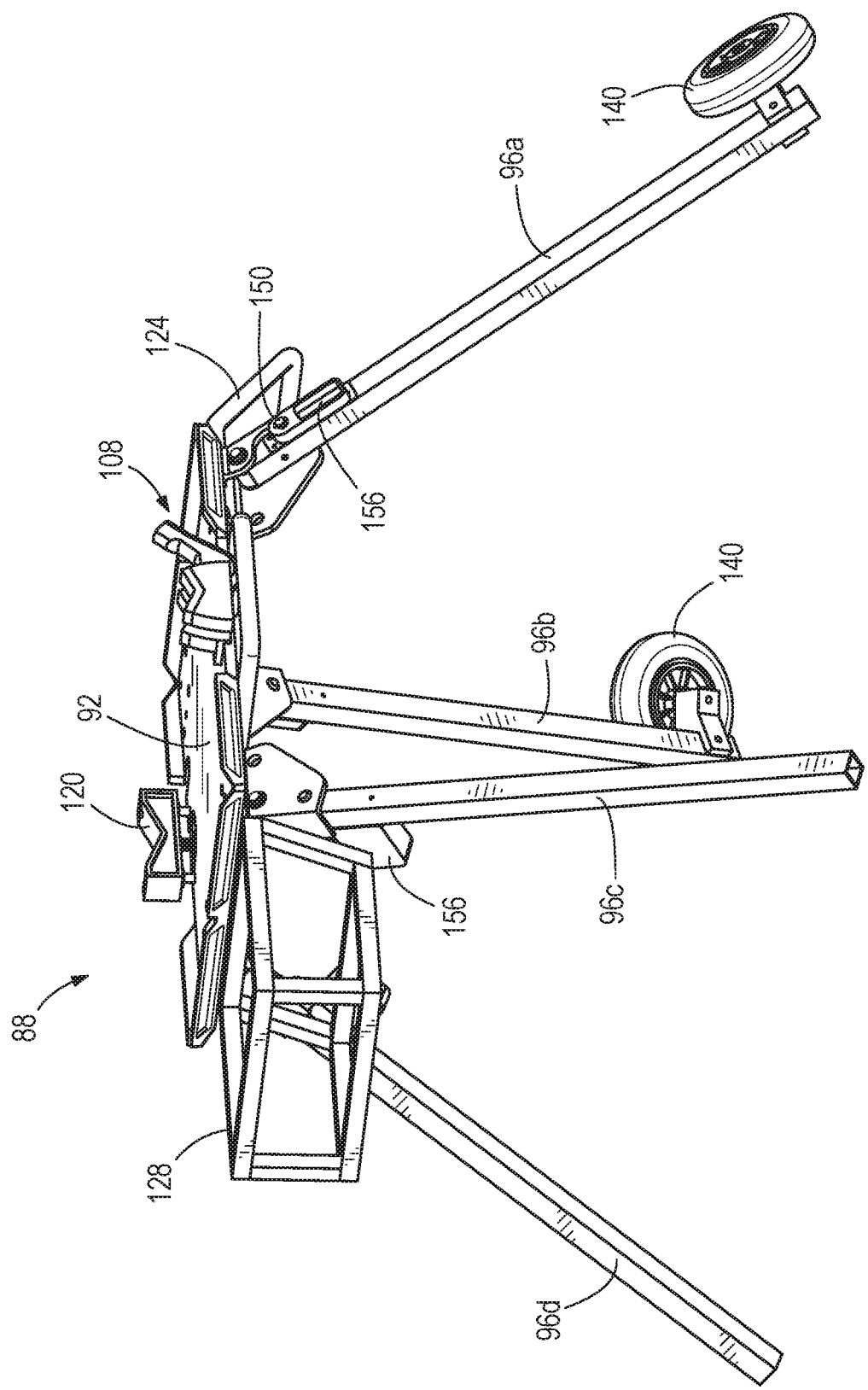
FIG. 6 is an alternative perspective view of the pipe fitting stand of FIG. 5.
Figure 7:
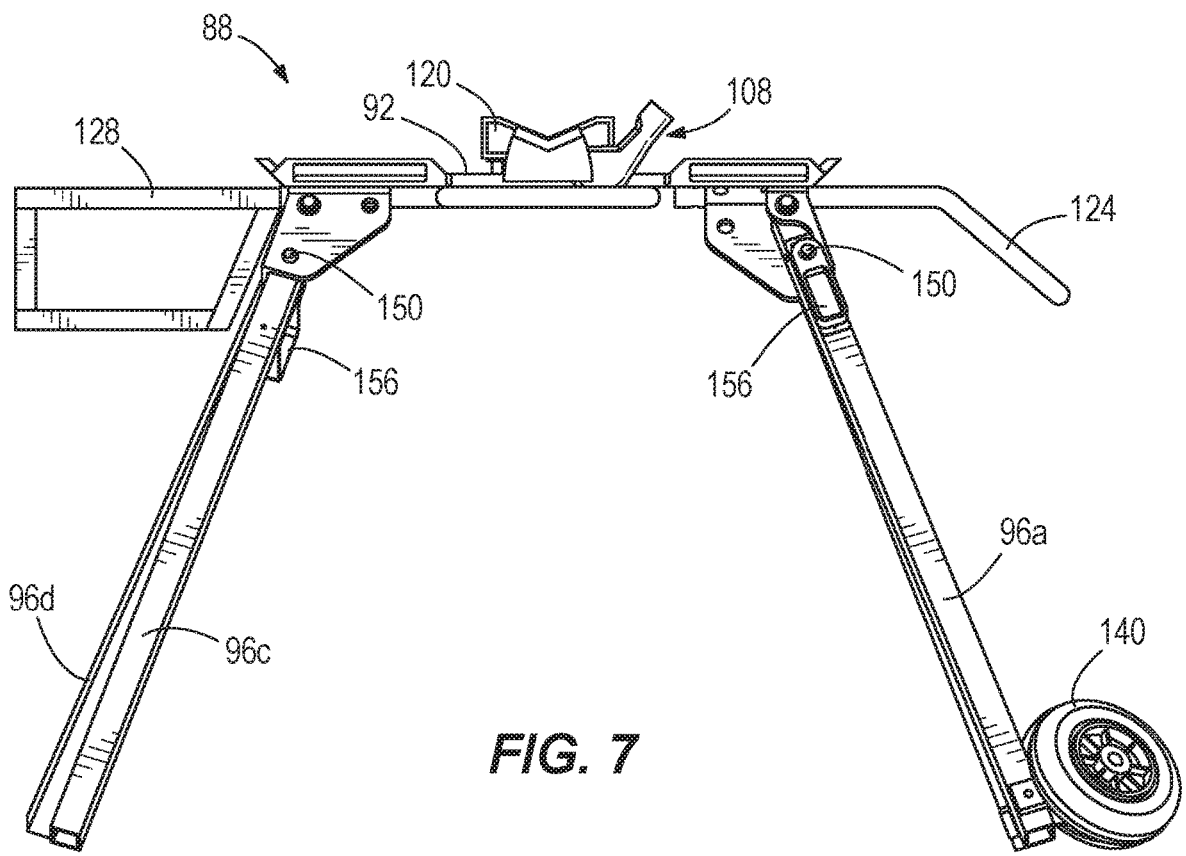
FIG. 7 is a side view of the pipe fitting stand of FIG. 5.
Figure 8:
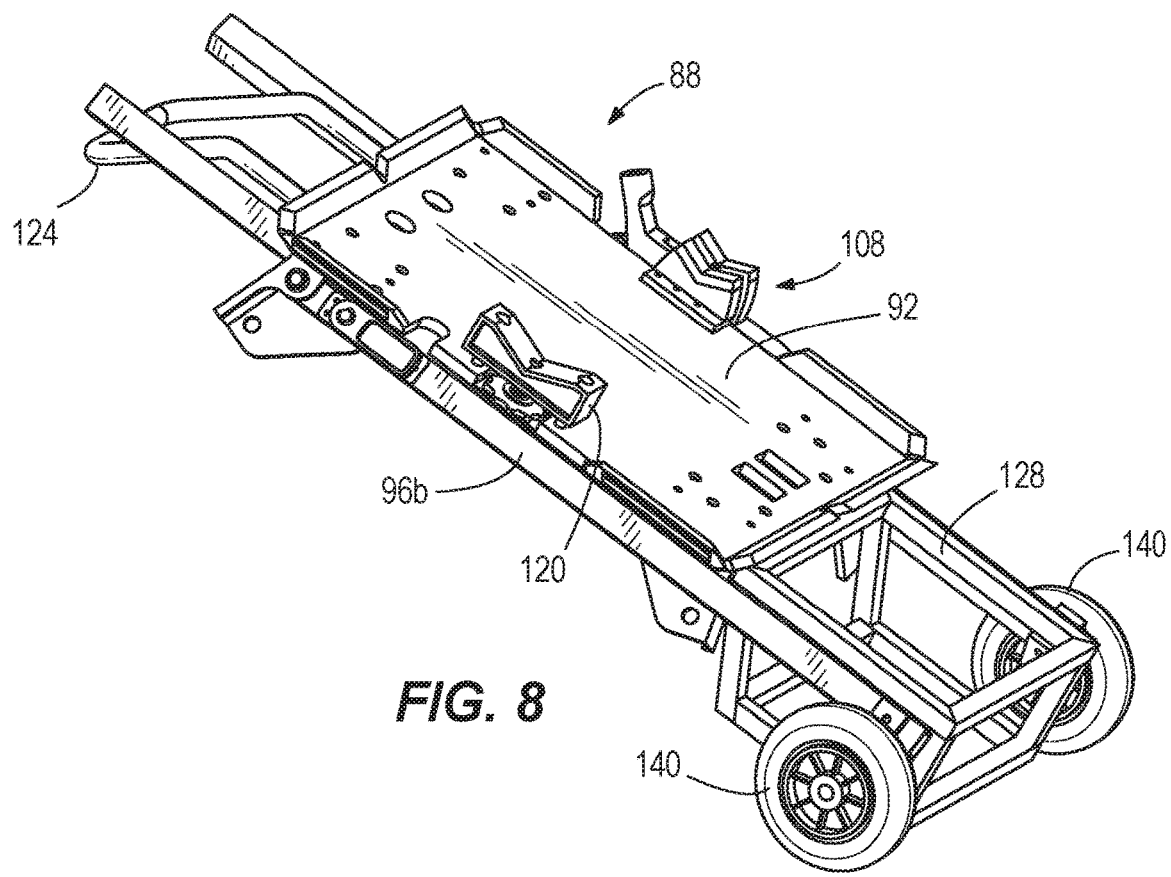
FIG. 8 is a perspective view of the pipe fitting stand of FIG. 5 in a folded state.
Figure 9:
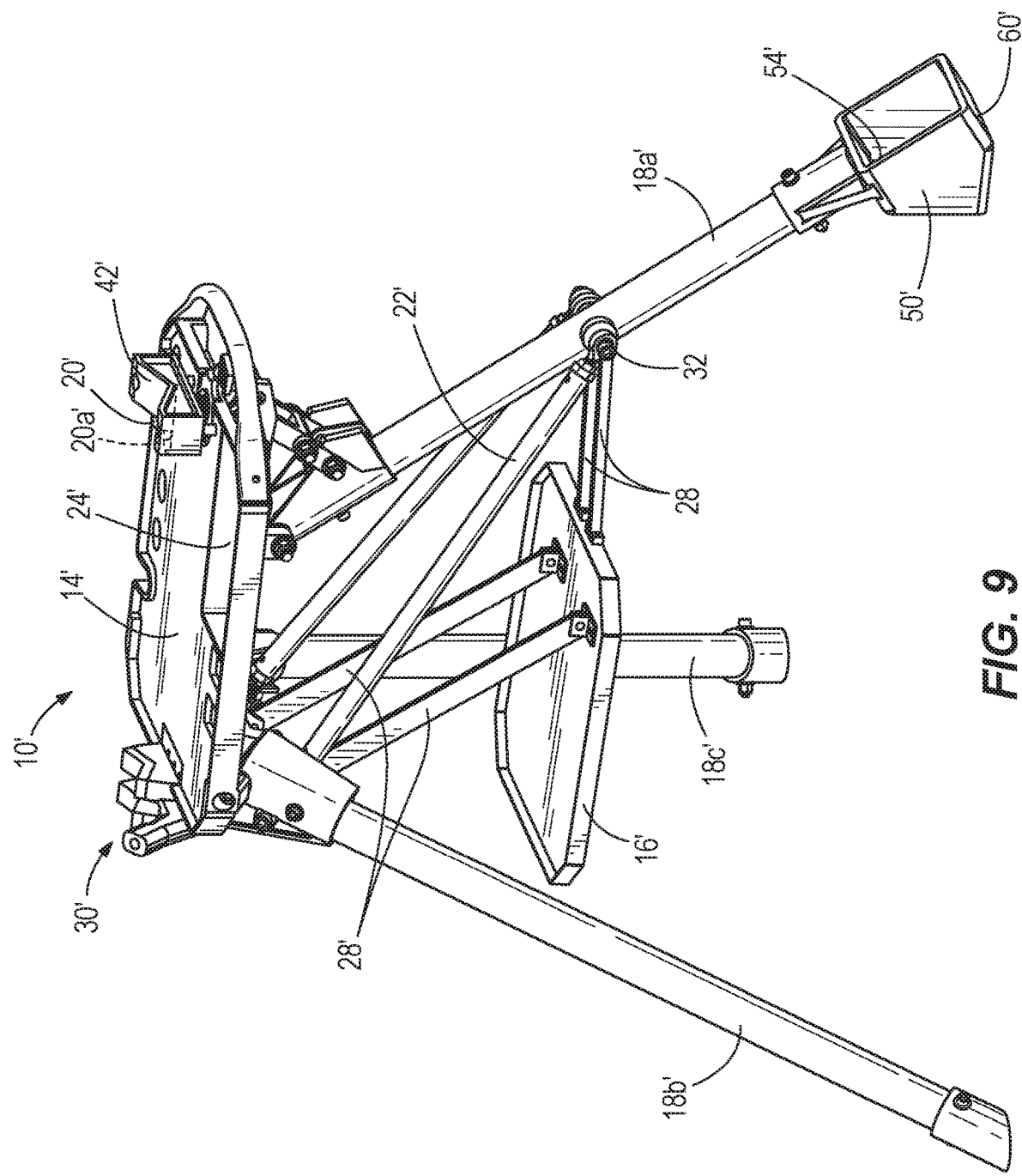
FIG. 9 is a perspective view of another pipe fitting stand in accordance with yet another embodiment of the invention, illustrating the pipe fitting stand in a deployed state.

FIG. 1 illustrates a pipe fitting stand 10 for supporting a pipe during a work operation. In the illustrated embodiment, the stand 10 includes a table 14 and three legs 18a-18c for supporting the table 14 in an elevated position with respect to a support surface. The stand 10 also includes two links 22 pivotably coupling a first of the legs 18a, respectively, with the other two legs 18b, 18c to coordinate movement of the legs 18a-18c as the stand 10 is reconfigured between a deployed state (shown in FIG. 1) and a folded state (FIG. 4).

With reference to FIG. 1, the table 14 includes a vise 30 at one end thereof for supporting and clamping a pipe to the table 14 and a support 42 located on a side of the table 14 opposite the vice 30 to additionally support the pipe. The support 42 is vertically adjustable relative to the table 14 (i.e., movable upward and downward) for adjusting the orientation of a pipe supported upon the support 42 and the vise 30.

Figure 1A:
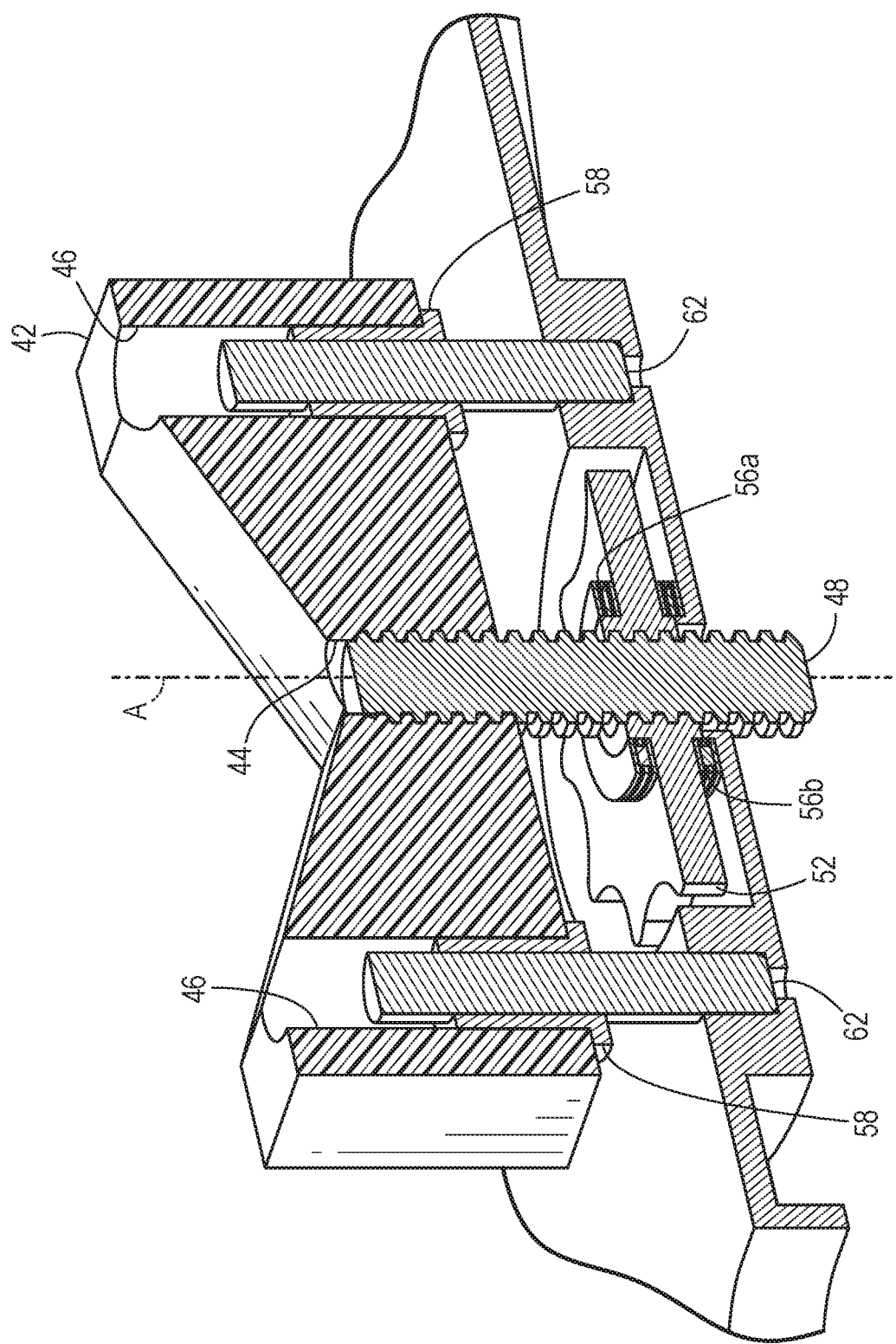
FIG. 1A is a perspective cross-sectional view of a portion of the pipe fitting stand of FIG. 1.

With reference to FIG. 1A, the support 42 includes a central aperture 44 extending along an axis A of the support 42, and two offset apertures 46 equidistantly disposed relative to the central aperture 44. A threaded rod 48 is affixed within the central aperture 44. The support 42 additionally includes a gear, or wheel 52, positioned between the table 14 and the support 42. The wheel 52 includes a threaded bore in which the rod 48 is received. An upper thrust bearing assembly 56a is positioned on an upper surface of the wheel 52, and a lower thrust bearing assembly 56b is positioned between a lower surface of the wheel 52 and the table 14. The offset apertures 46 include bushings 58 positioned within the apertures 46 to accept two cylindrical posts 62. The cylindrical posts 62 are anchored to the table 14 and are slidably received within the apertures 46 in order to prevent rotation of the support 42 relative to the table 14.

In order to move the support 42 relative to the table 14, the user may rotate the wheel 52 in a first direction (e.g., counterclockwise from the frame of reference of FIG. 1A). While rotating, the wheel 52 imparts translation to the threaded rod 48 in a downward direction, thus lowering the support 42 relative to the table 14. Likewise, rotation of the wheel 52 in an opposite direction imparts translation to the rod 48 in the opposite direction (e.g., upward), thus raising the support 42 relative to the table 14. The lower thrust bearing assembly 56b rotatably supports the wheel 52 on the table 14, while the upper thrust bearing assembly 56a reduces friction between the support 42 and the wheel 52 when the bottom surface of the support 42 contacts the bearing assembly 56a when the support 42 is in its lowermost position.

Each of the legs 18a-18c is separately pivotably coupled to the table 14. However, as mentioned above, the links 22 interconnect the legs 18a, 18b and the legs 18a, 18c, respectively, such that pivoting movement of the leg 18a relative to the table 14 causes the other legs 18b, 18c to also pivot relative to the table 14. The leg 18a includes a stirrup 50 having a bottom surface 60 that defines a ground-contacting surface of the leg 18a and an aperture 54 through which the foot of a user is receivable.

The stand 10 also includes a locking mechanism 64 extending between the table 14 and the leg 18a for selectively locking the leg 18a into a deployed position (shown in FIG. 1). Because the other legs 18b, 18c are connected to the leg 18a via the links 22, the legs 18b, 18c are also locked into a deployed position when the leg 18a is locked into the deployed position by the locking mechanism 64. The locking mechanism 64 includes a latch 68, which is manipulated by the user to alternately lock and release the locking mechanism 64.

Figure 2:
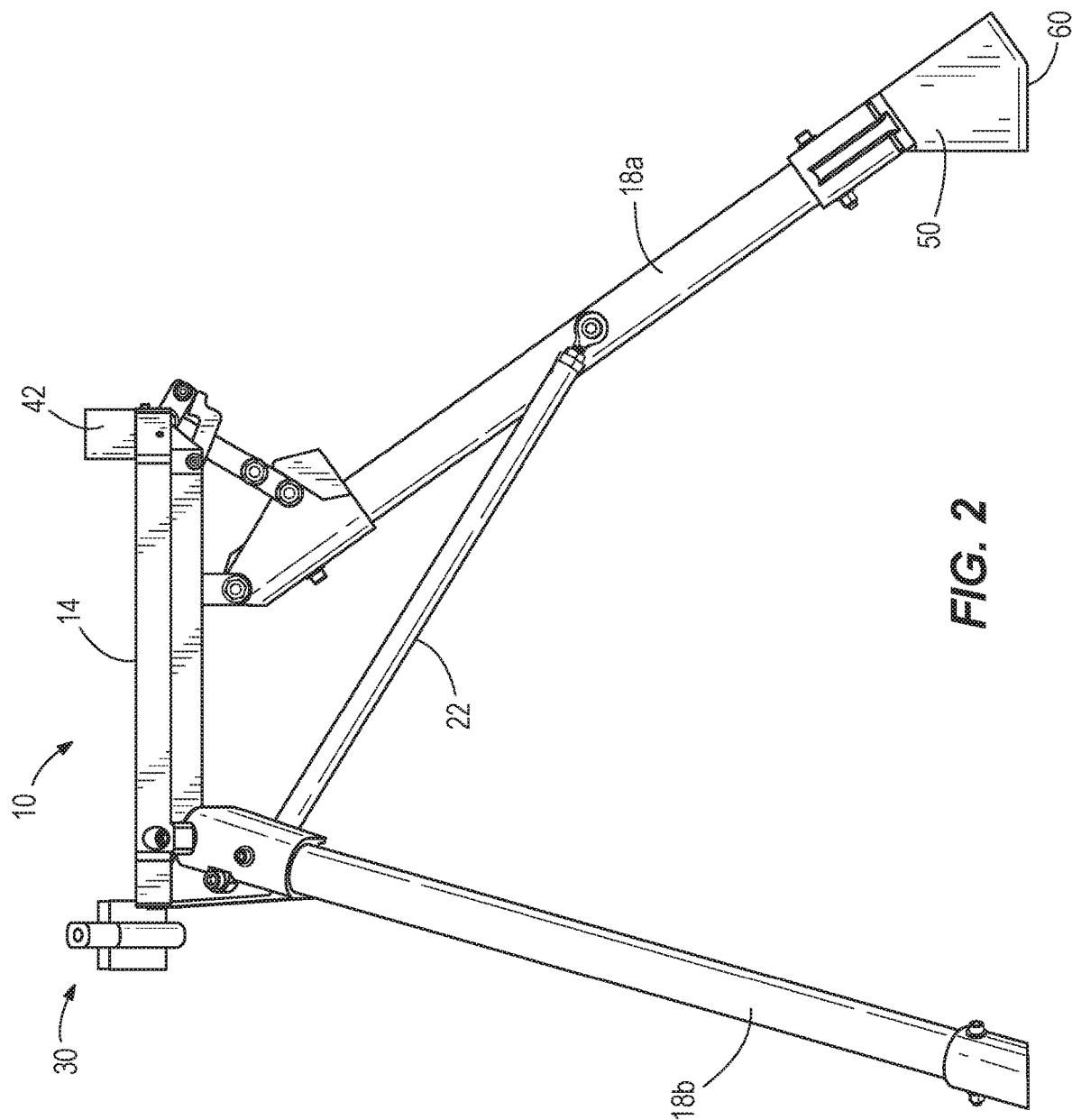
FIG. 2 is a side view of the pipe fitting stand of FIG. 1.
Figure 3:
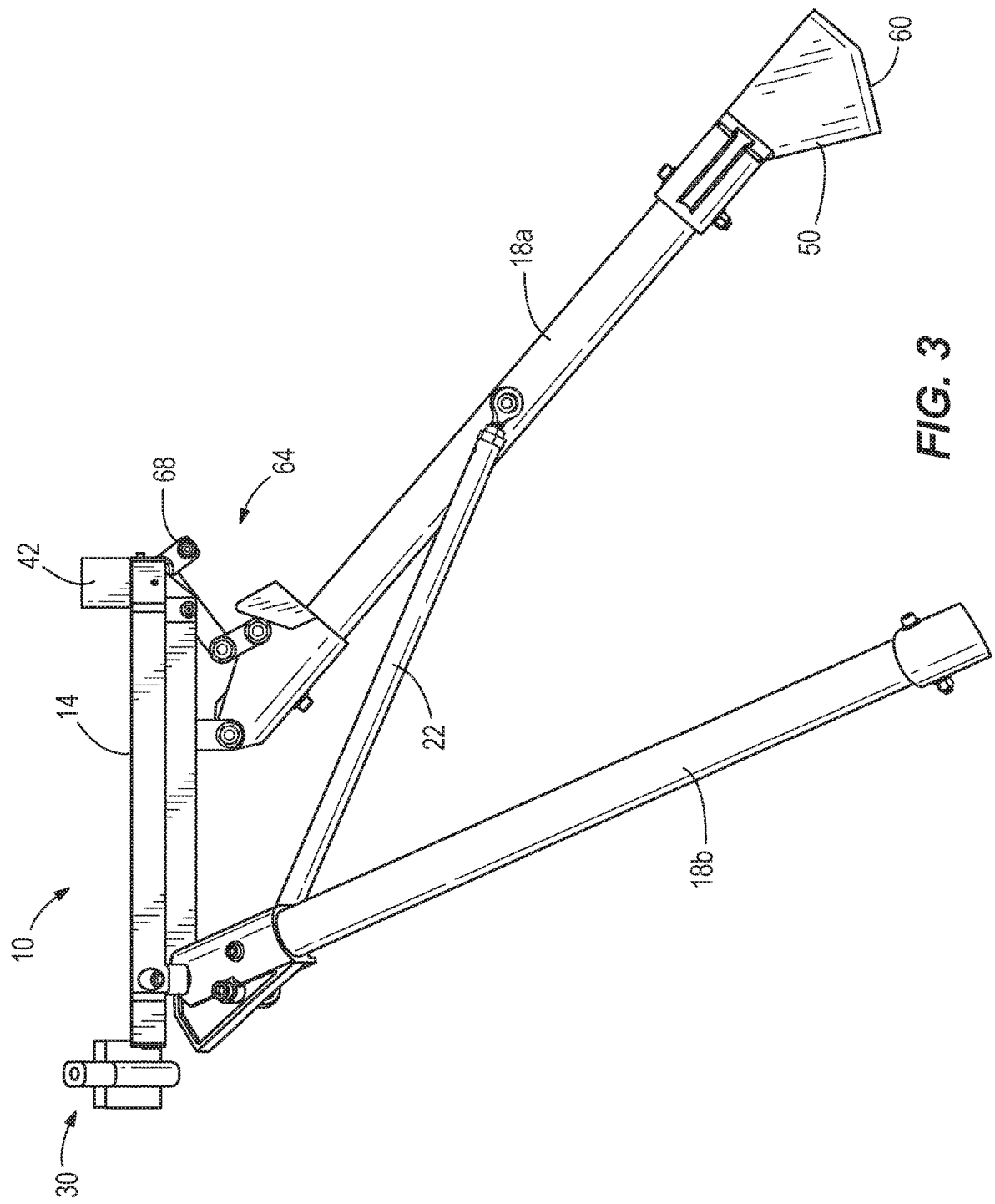
FIG. 3 is a side view of the pipe fitting stand of FIG. 1 transitioning from a deployed state toward a folded state.

To fold the stand 10 from the deployed state (FIGS. 1 and 2) to a folded state (FIG. 4), a user releases the latch 68 while maintaining pressure on the stirrup 50 (with the user's foot extending through the aperture 54) in order to keep the bottom surface 60 of the stirrup 50 in contact with the ground. The user then lifts the side of the table 14 opposite the leg 18a, subsequently causing the table 14 to pivot relative to the leg 18a. At the same time, the remaining legs 18b, 18c are lifted from the ground and are pivoted relative to the table 14 by the links 22 (FIG. 3). When the stand 10 is in the fully folded state shown in FIG. 4, the legs 18b, 18c are positioned side by side with the leg 18a, with the leg 18a between the other two legs 18b, 18c. The user can then easily store and transport the stand 10. The stand 10 can be reconfigured from the folded state to the deployed state using a reverse procedure.

FIG. 5-8 illustrate an alternative embodiment of a pipe fitting stand 88. The stand 88 includes a table 92 and four legs 96a-96d for supporting the table 92 in an elevated position with respect to a support surface. Each of the legs 96a-96d is separately pivotably coupled to the table 92, and the stand 10 further includes a separate locking mechanism associated with each of the legs 96a-96d. In the illustrated stand 88, the locking mechanism includes a pin detent 150 carried by the respective legs 96a-96d and a handle 156 for actuating the pin detent 150 between a locked position in which the associated leg 96a-96d is maintained in either a deployed position or a folded position, and a released position, in which the associated leg 96a-96d is movable between the deployed and folded positions. Two of the legs 96a, 96b include wheels 140 to facilitate transport of the stand 88.

The table 92 includes a vise 108 at one end thereof for supporting and clamping a pipe to the table 92 and a support 120 located on a side of the table 92 opposite the vise 108 to additionally support the pipe. In one embodiment of the stand 88, the support 120 is vertically adjustable relative to the table 92 (i.e., movable upward and downward) for adjusting the orientation of a pipe supported upon the support 120 and the vise 108.

An operating handle 124 extends from a side of the table 92 proximate the legs 96a, 96b for a user to grasp during transport and/or operation of the stand 88. A storage compartment 128 (FIG. 8) extends from an opposite side of the table 92 to provide storage for tools and other items during transport and/or operation of the stand 88.

The legs 96a-96d fold inwardly such that the non-wheeled legs 96c, 96d fold towards the wheeled legs 96a, 96b, and the wheeled legs 96a, 96b fold towards the non-wheeled legs 96c, 96d. When in the folded positon shown in FIG. 8, the wheeled legs 96a, 96b are positioned alongside the storage compartment 128, and the non-wheeled legs 96c, 96d are positioned alongside the handle 124. Consequently, the wheels 140 are positioned on opposite sides of the storage compartment 128, and on an opposite side of the table 92 as the handle 124. The user then tilts the stand 88 in such a way that the operating handle 124 is held in an inclined orientation with the wheels 140 contacting the ground, allowing a user to easily transport the stand 88.

FIGS. 9-13 illustrate another alternative embodiment of a pipe fitting stand 10', with like parts as the pipe fitting stand 10 of FIGS. 1-4 being shown with like reference numerals plus a prime marker (').

Figure 13:
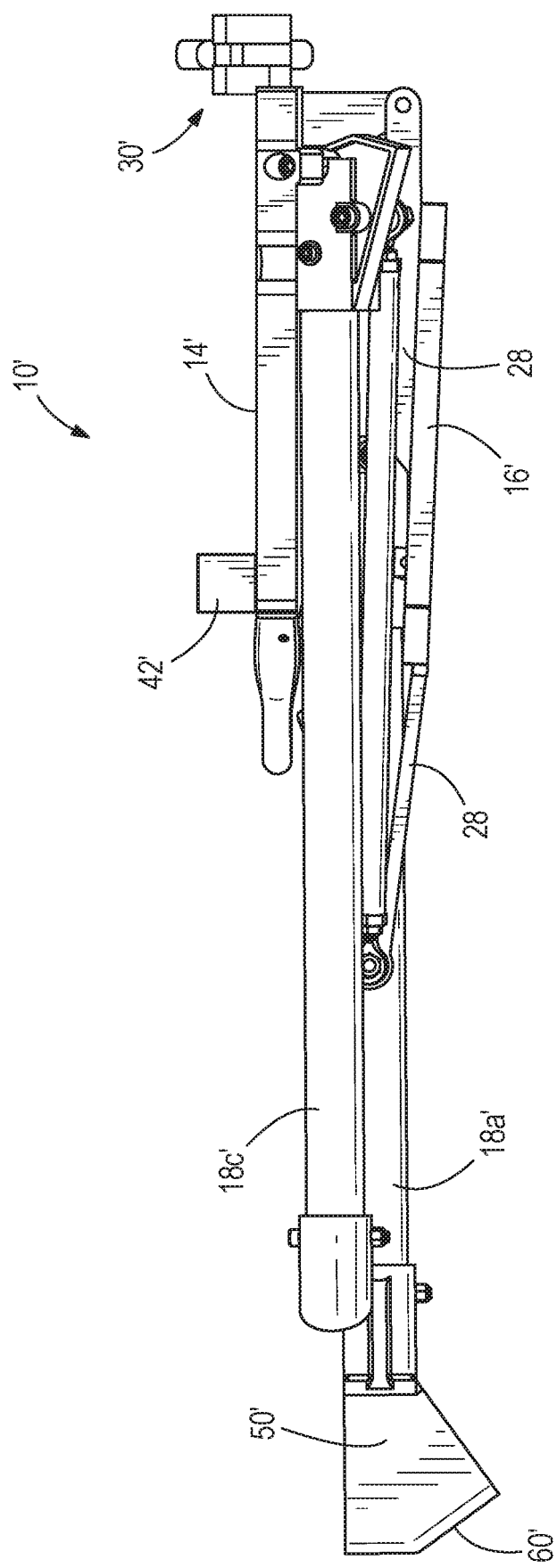
FIG. 13 is a side view of the pipe fitting stand of FIG. 9 in a folded state.

The illustrated pipe fitting stand 10' includes a table 14' and three legs 18a'-18c' for supporting the table 14' in an elevated position with respect to a support surface. The stand 10' also includes two links 22' pivotably coupling a first of the legs 18a', respectively, with the other two legs 18b', 18c' to coordinate movement of the legs 18a'-18c' as the stand 10' is reconfigured between a deployed state (FIGS. 9-11) and a folded state (FIG. 13). The table 14' includes a vise 30' at one end thereof for supporting and clamping a pipe to the table 14' and a support 42' located on a side of the table 14' opposite the vice 30' to additionally support the pipe. The support 42' is vertically adjustable relative to the table 14' (i.e., movable upward and downward) for adjusting the orientation of the pipe on the stand 10'. In some embodiments, the vice 30' may include a chain for securing the pipe in place while positioned on the table 14'. The vice 30' may additionally include a storage portion (not shown) for storing the chain during storage or carrying of the pipe stand 10'.

Figure 10:
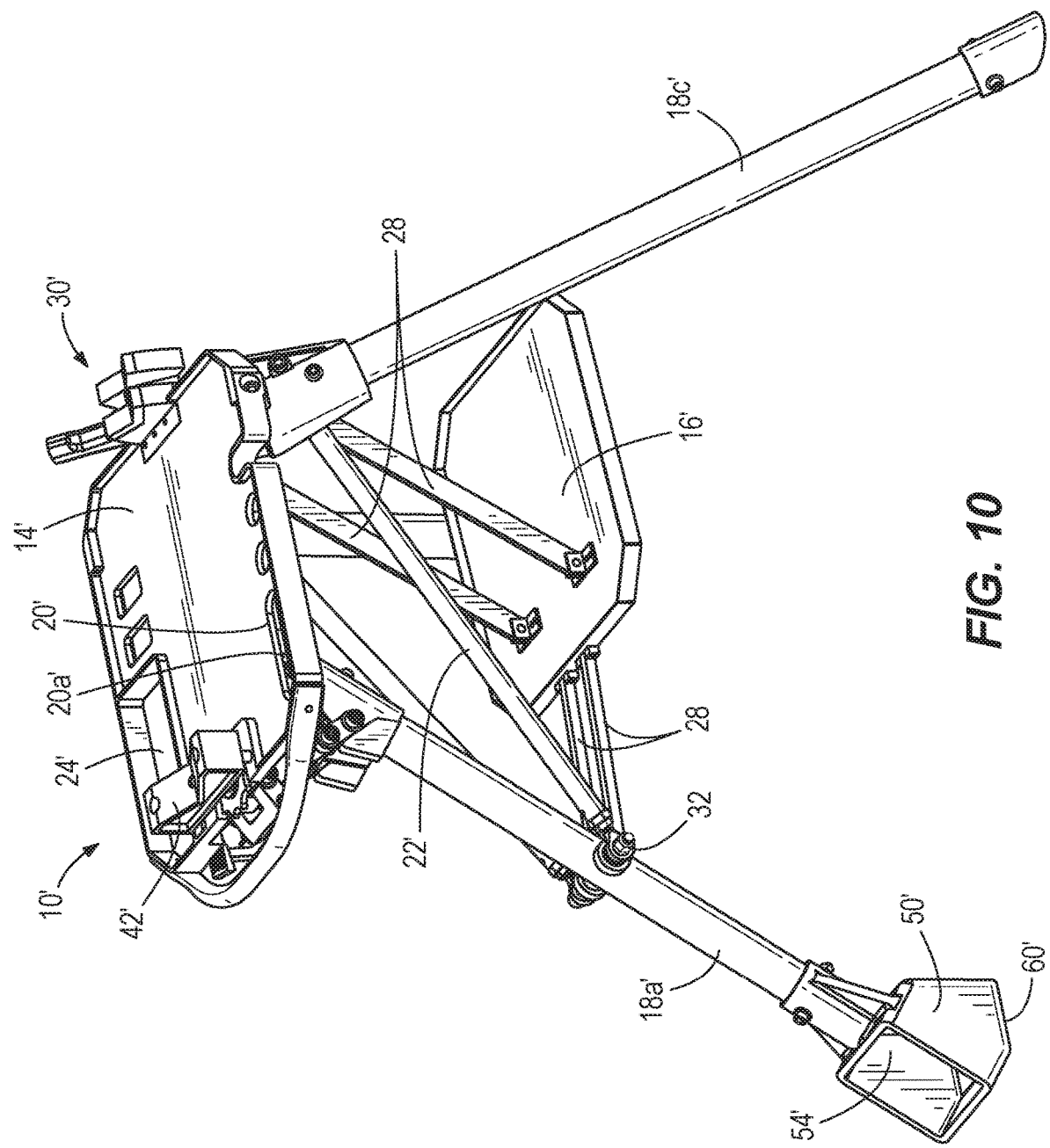
FIG. 10 is a reverse perspective view of the pipe fitting stand of FIG. 9.
Figure 11:
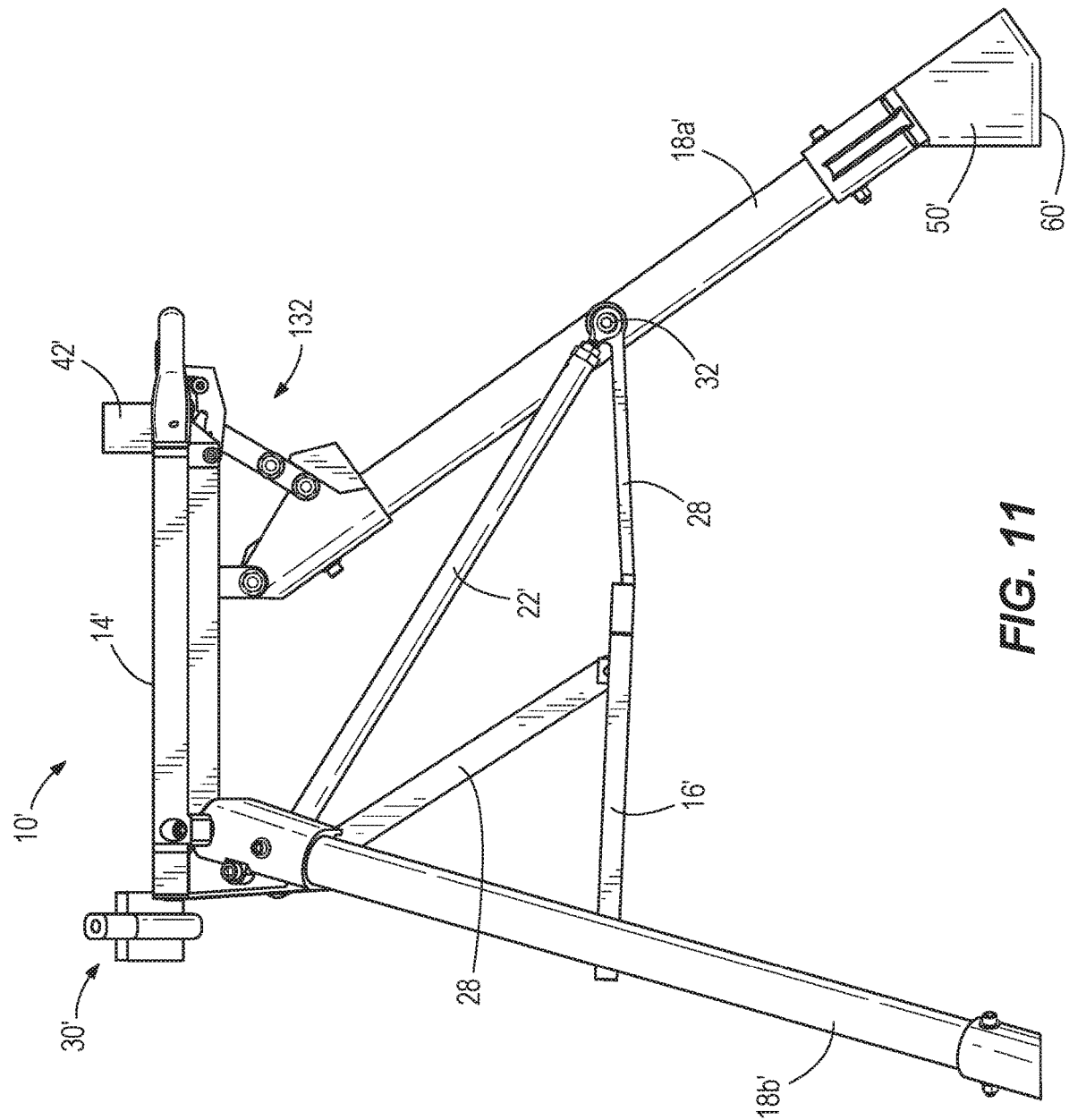
FIG. 11 is a side view of the pipe fitting stand of FIG. 9.

The table 14' additionally includes a carrying handle 20' positioned on a side of the table 14' (FIG. 10). A user may grasp the carrying handle 20' for additional support when using or transporting the pipe stand 10'. Furthermore, the user may temporarily store tools within an aperture 20a' formed in the table 14' that at least partially defines the carrying handle 20'. Substantially opposite the carrying handle 20', the table 14' includes a storage portion 24'. The storage portion 24' is recessed within the table 14' such that the storage portion 24' may receive small items (e.g., writing utensils, small tools) while a user is using the stand 10'.

For additional storage, the stand 10' also includes a shelf 16' positioned beneath the table 14'. The shelf 16' is pivotably coupled to the legs 18b', 18c' through respective linkages 28 coupled to the underside of the table 14'. Additionally, the shelf 16' is pivotably coupled to the leg 18a' by parallel linkages 28 extending from an edge of the shelf 16' for connection to the same pivot shaft 32 to which the linkages 22' are pivotably coupled to the leg 18a'. When the legs 18a'-18c' pivot relative to the table 14' into the folded position, the linkages 28, 29 pivot the shelf 16' upward and towards the underside of the table 14', such that the shelf 16' and the legs 18a'-18c' are substantially parallel to the table 14' (FIG. 13). The leg 18a' further includes a stirrup 50' having a bottom surface 60' that defines a ground-contacting surface of the leg 18a' and an aperture 54' through which the foot of a user is receivable.

Figure 12:
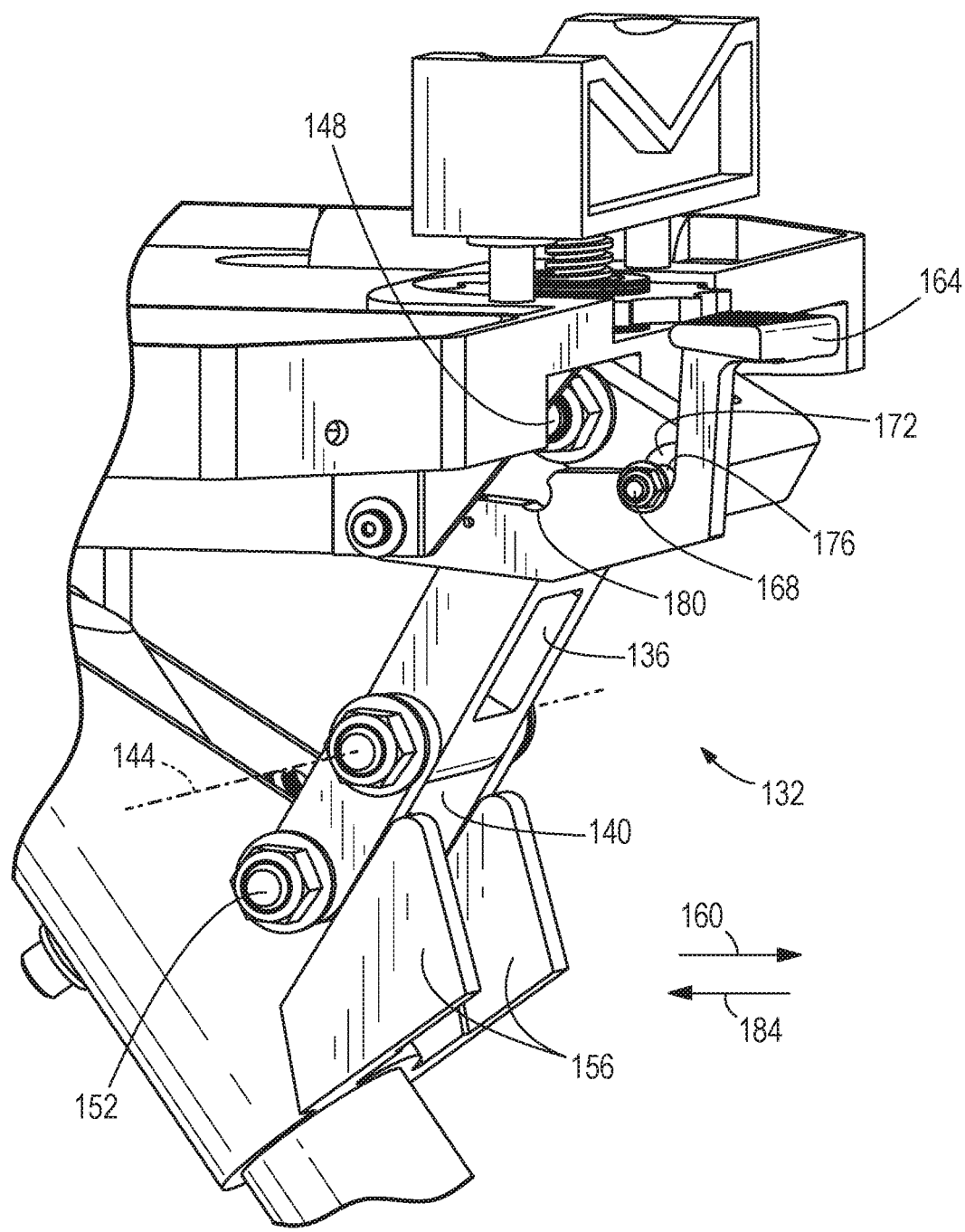
FIG. 12 is an enlarged view of a portion of the pipe fitting stand of FIG. 11, illustrating a latch mechanism for securing the stand in each of the deployed state and the folded state.

In order to lock the stand 10' in the folded position, the table 14' includes a locking mechanism 132 (FIG. 12). The locking mechanism 132 includes a first link 136 pivotably coupled to a second link 140 about an axis 144. The first link 136 is pivotably coupled to the underside of the table 14' via a first fastener 148 (e.g., bolt, screw, etc.), which extends through the link 136 and a portion of the table 14'. The second link 140 is pivotably coupled to the leg 18a' via a fastener 152 (e.g., bolt, screw, etc.). The second link 140 additionally extends parallel to flanges 156 of the leg 18a', which may contact the link 140 and prevent the link 140 from pivoting further than the flanges 156 in a first direction 160.

The locking mechanism 132 also includes a latch 164 pivotably coupled to the underside of the table 14'. The latch 164 is adjacent the first link 136 and engageable with the first link 136 to prevent pivoting movement of the first link 136, and thus, pivoting movement of the second link 140 and the leg 18a'. Because the leg 18a' is pivotably coupled to the other legs 18b', 18c' by the respective links 22', all of the legs 18a'-18c' are locked in either a deployed position or a folded position when the latch 164 locks the leg 18a' in its deployed or folded positions, respectively. Specifically, the first link 136 includes a fastener 168 (e.g., bolt, screw, etc.) securing a striker 172 to the first link 136. The striker 172 is engageable and received within a first arcuate groove 176 in the latch 164 to secure the legs 18a'-18c' in their deployed positions. The latch 164 further includes a second arcuate groove 180 for receiving the striker 172 when the legs 18a'-18c' are pivoted into their folded positions to thereby lock the legs 18a'-18c' in their folded positions.

When a user wants to retract the legs 18a'-18c' into the folded position, the user depresses the latch 164. The latch 164 therefore moves downward, disengaging the striker 172 from the first arcuate groove 176. Due to the position of the flanges 156, the second link 140 is only capable of pivoting in a second direction 184, which causes the first link 136 to pivot about the pivot axis 144 and also pivot in the second direction 184. As the links 136, 140 pivot, the legs 18a'-18c' fold upwards towards the table 14'. If the latch 164 is released during this time, the striker 172 slides along an edge of the latch 164 extending between the grooves 168, 180, and then falls into the second arcuate groove 180 to lock the legs 18a'-18c' in their folded positions.

Various features of the invention are set forth in the following claims.

What is claimed is:

1. A pipe fitting stand for supporting a pipe during a work operation, the pipe fitting stand comprising:
   a table;
   a plurality of legs coupled to the table and movable between a deployed position and a stowed position;
   a vise coupled to the table for supporting a first portion of the pipe;
   a support positioned on a side of the table opposite the vise upon which a second portion of the pipe is supported, wherein the support is adjustable relative to the table, thereby adjusting the orientation of the pipe relative to the table;
   an actuator supported by the table;
   a threaded rod extending between the support and the actuator, wherein rotation of the actuator imparts translation to the support relative to the table; and
   parallel posts extending from the table that are received within corresponding apertures in the support, wherein the posts prevent rotation of the support in response to rotation of the actuator.

2. The pipe fitting stand of claim 1, wherein the support is vertically adjustable relative to the table.

3. The pipe fitting stand of claim 1, further comprising a latch mechanism engageable with one of the plurality of legs for locking the legs in each of the deployed position and the stowed position.

4. The pipe fitting stand of claim 1, further comprising a recessed storage portion defined in the table and operable to hold a plurality of items.

5. The pipe fitting stand of claim 1, wherein the vise includes a chain for securing the first portion of the pipe to the table.

6. The pipe fitting stand of claim 5, wherein the vise further includes a storage portion for storing the chain.

7. The pipe fitting stand of claim 1, further comprising a shelf coupled to the plurality of legs via a linkage mechanism, wherein the shelf is moveable to a position that is substantially parallel with the table when the plurality of legs are pivoted from the deployed position to the stowed position.

8. The pipe fitting stand of claim 1, further comprising a handle configured to be grasped by a user, wherein the handle is at least partially defined by an aperture in the table, and wherein the aperture is configured to receive tools therein for supporting the tools on the table.

9. The pipe fitting stand of claim 1, further comprising a stirrup coupled to one of the plurality of legs to facilitate pivoting the plurality of legs between the deployed position and the stowed position.

10. The pipe fitting stand of claim 1, further comprising a wheel coupled to at least two of the plurality of legs to facilitate transport of the stand when the legs are pivoted to at least one of the deployed position or the stowed position.

11. The pipe fitting stand of claim 1, wherein the threaded rod is rotationally affixed to the support, wherein the actuator includes a threaded bore in which the threaded rod is received, and wherein rotation of the actuator relative to the table raises or lowers the threaded rod, and thus the support, relative to the table.

12. The pipe fitting stand of claim 1, wherein the legs are configured to move in the same direction relative to the table when being adjusted from the deployed position to the stowed position.

* * * * *